Patented Aug. 21, 1934

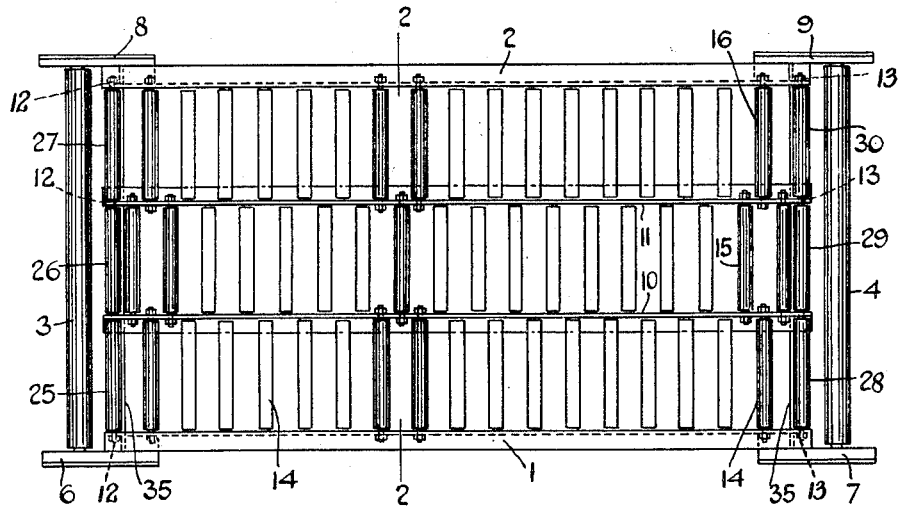

1,970,899

UNITED STATES PATENT OFFICE 1,970,899

MOVABLE FLOOR VEHICLE

Allan Everett Renwick, Cardiff, Wales, assignor to Movable Floor (Vehicles) Limited, Cardiff, Wales Application March 18, 1932, Serial No. 599,807 In Great Britain May 18, 1931

2 Claims. (Cl. 214—83)

This invention relates to movable floor vehicles such as motor lorries and the like with more especial reference to those in which a band of flexible material is mounted on drums or rollers at each end of the vehicle body and is supported throughout its length by freely rotatable rollers.

Such a vehicle is described in Patent No. 1,722,106 issued July 23rd, 1929, the band of flexible material being secured to the end drums which are operably rotatable by chain and sprocket to cause movement of the floor when loading or discharging.

The general object of the present invention is to provide a movable floor vehicle with enhanced utility and efficiency, wherein substantially continuous support is afforded the floor between the end drums or rollers and a particular object of the invention is to render the supporting rollers more readily accessible for removal and replacement.

A further object is to provide a construction necessitating a minimum of operating effort to move the floor when loading or discharging.

According to the invention a movable floor vehicle comprises end drums or rollers mounting a band of flexible material constituting the floor and intermediate rollers supporting the band arranged in parallel rows with the rollers of each row staggered in relation to the rollers of adjacent rows.

Conveniently, side frames or longitudinals of channel form extend for the length of the vehicle body and carry the end drums or rollers by which movement of the floor for loading and discharging is effected, while a pair of intermediate longitudinals, say of angle iron divide the frame transversely and co-operate with the side frames to provide a mounting for three rows of rollers supporting the floor.

The rollers of adjacent rows are arranged in staggered relation and each roller is mounted to rotate freely on its own individual rigid axle, although the supporting rollers at each end of the frame may with advantage be mounted on a common axle extending transversely between the side frames or longitudinals and supporting the intermediate longitudinals.

The supporting rollers may rotate on ball bearings and their axles be secured in the frame through the medium of screw-threaded extensions passing apertures in the vertical walls of such frame and receiving nuts so that removal and replacement may be rapidly effected by simply removing the nuts of the particular axle and withdrawing the axle and roller from the assembly.

In preferred embodiments of the invention there is associated with each end drum or roller mounting the flexible band constituting the floor an operating gear-box giving the desired ratio of reduction and appropriately encased or housed so as to substantially exclude dust and moisture from the gear train while retaining lubricant adequate for the smooth operation of the train of reduction gears, the gear boxes being mounted in any convenient manner at the extremities, of say, the near side longitudinal frame member.

Preferably, also the operating shaft of each gear-box is squared or otherwise formed for the receipt of a removable operating handle by rotation of which the floor may be moved as required; for instance, when operating the gear-box associated with the rear end drum the flexible band will move rearwardly and the contents of the vehicle will be discharged, while conversely when operating the front end drum the floor will be moved forwardly as in loading.

Advantageously, provision is made for uncoupling the idle gear box, that is the front gear box when unloading and the rear gear box when loading, so that unnecessary effort will not be expended in idly rotating its reduction train, and to this end the operating shaft of each box may be axially displaceable so that the spur pinions mounted thereon can be disconnected from the reduction train.

The invention will be further described with reference to the accompanying drawing which illustrates a preferred embodiment of movable floor for vehicles, and in which,—

Fig. 1 is a plan view of the structure, the flexible band constituting the actual flooring having been removed in order to more clearly show the disposition of its supporting rollers.

Fig. 2 is a transverse section on the line 2—2 of Fig. 1 illustrating how the angle irons employed for the intermediate longitudinals form the centre bearings for the rollers, and Fig. 3 is a near side elevation of the movable floor unit ready for attachment to a vehicle and fitted at each end with an operating gear-box by which the energy expended in operating the floor is considerably reduced.

Fig. 4 is a side elevation to a larger scale illustrating a convenient form of operating gear-box detached.

Referring now to the drawing, 1 and 2 generally designate side frames of channel form which extend between end drums or rollers 3 and 4 mounting the flexible band 5.

When applied to a motor lorry or similar vehicle the movable floor structure will be securely mounted on the vehicle chassis so that the end drum 3 is located at the forward end of the body space and the end drum 4 is located at the rear extremity of the vehicle, the extent of the side frames 1 and 2 being thus dependent on the body space available.

6 and 7 indicate malleable iron castings of trough-shape secured to the front and rear ends respectively of the near side of longitudinal frame member 1, being hereafter referred to as gearbox casings, and housing the operating and reduction gear described more fully in reference to Fig. 4.

8 and 9 are brackets conveniently in the form of castings secured to the front and rear ends respectively of the off-side longitudinal frame member 2, the front winding drum or roller 3 being rotatably mounted in bearings formed in the casing 6 and the bracket 8, and the rear drum 4 being similarly mounted in the casing 7 and the bracket 9.

Intermediate the side frames 1 and 2 are a pair of longitudinals in the form of angle irons 10 and 11 which are supported at each end by rods 12 and 13 extending transversely between the side frames 1 and 2.

In the embodiment illustrated three series of rollers support the flexible band 5, the rollers of the series being designated respectively 14, 15 and 16, the series of rollers 14 being located between the side frame 1 and the intermediate longitudinal angle iron 10, 15 being the central series between the intermediate longitudinal angle irons 10 and 11, and 16 the off-side series located between the intermediate longitudinal angle iron 11 and the off-side frame 2.

The rollers conveniently take the form shown more clearly in Fig. 2 and consist of tubular members 17 rotating freely about rigid axles 18, any appropriate form of anti-friction bearing, such as the ball bearing shown at 19, being employed and the axles being provided with screw-threaded extensions 20, 21 at the respective ends which project through the particular frame members, for instance, the intermediate longitudinal angle irons 10 and 11, and receive securing nuts 22 and 23.

The staggered relation of the rollers of adjacent rows is clearly apparent from Fig. 1, and it will be appreciated that in addition to providing a more uniformly distributed support over the underface of the flexible band 5, the arrangement possesses the further and important utility that access may be had to any roller and its removal and replacement effected without disturbing adjacent rollers.

The only dismantling operation necessary when it is required to replace or examine a defective roller is the removal of one of the securing nuts 22 or 23 associated with the axle 18 of the particular roller when such axle can be withdrawn and thereafter the roller is free for detachment from the assembly.

To facilitate withdrawal of the axles 18 the inner race 24 of each ball bearing 19 is arranged as a sliding fit on its axle 18, and, moreover, is arranged to project beyond the extremity of the tubular body of the roller into engagement with the frame member, so that the roller can rotate freely without fouling the frame members at either end.

As previously mentioned, the intermediate longitudinal angle irons 10 and 11 are supported by rods 12 and 13 extending transversely between the front and rear ends of the side frames 1 and 2 and conveniently such rods constitute fixed axles for aligned end rollers designated 25, 26 and 27 in the case of the rod 12, and 28, 29 and 30 in the case of the rear rod 13.

The construction of the rollers 25, 26, 27 and 28, 29, 30 may be the same as that of the other supporting rollers, although the rods 12 and 13 respectively constitute common rigid axles for the aligned rollers at the front and rear ends of the structure.

With a view to reducing the effort required to operate the floor when loading or discharging, an operating gear-box is associated with each end drum 3 and 4 respectively.

Referring now more especially to Figs. 3 and 4, the aforementioned casings 6 and 7 house reduction trains between an operating shaft 35 and the shaft 36 mounting the end drum, such train consisting of a pinion 37 mounted on the operating shaft 35 and enmeshed with an intermediate gear wheel 38 rotating about a spigot in the casing and having integral with or secured to it a second pinion 39 driving a large spur wheel 40 keyed to the shaft 36 of the end drum.

The near side end of the operating shaft 35 is shown formed as a square boss 47 for the receipt of an operating handle and by means of the reduction effected by the train 37, 38, 39 and 40, the effort necessary to move the floor when loading or discharging is considerably reduced.

Where the flexible band 5 constituting the floor has its ends secured to the respective drums 3 and 4 it is necessary to provide for the independent operation of both drums, and accordingly in the embodiment illustrated a reduction train is provided for each drum, and it will be understood that in the absence of specific provision being made to prevent idle rotation one of the reduction trains would be rotated idly each time the floor was operated; for instance, when loading the handle would be attached to the operating shaft 35 of the front gear-box 6 and the drum 3 rotated through the reduction train, so that the flexible band was moved forwardly and in unwinding from the rear drum 4 would idly rotate the reduction train associated with this drum.

To avoid the considerable loss of effort consequent on such idle rotation of the reduction train temporarily inoperative, provision is made for uncoupling the operating shaft 35 from the gear train and to this end the operating shaft 35 is made movable axially.

In the operative position, the spur pinion 37 engages the spur wheel 38, while when out of use a simple axial movement of the shaft 35 disengages the pinion 37 from the wheel 38 and frees the train.

In Fig. 4, 41 represents a pawl or bridge piece pivoted in the casing 7 at 42 and having a pin 43 projecting into an arcuate slot 44 provided in the cover 45 which may be of sheet metal and which forms a dustproof closure for the gearbox casing.

Connected to the pawl 41 is a tension spring 46 which operates to temporarily maintain the pawl with its pin 43 at either end of the arcuate slot 44.

When it is desired to maintain the pinion 37 on the operating shaft 35 uncoupled, the operating shaft is axially moved as aforementioned and the pin 43 which projects through the cover plate 45 is engaged by the finger of the operator and moved to the bottom of the slot 44, whereat the nose of the pawl 41 moves downwardly and bridges the gap between the pinion 37 in the rear wall of the casing 7, thereby holding the pinion out of engagement with the gear wheel 38 of the train and the pawl 41 is held in this position by the spring 46 until released.

Associated with the pawl or bridge piece 41 may be any appropriate spring means which normally urges the operating shaft 35 to a position with the pinion 37 enmeshed with the reduction train.

Provision may also be made for locking the floor against movement, for instance during the transit of goods, and may with advantage take the form of a spring-urged pawl similar to the pawl 41, but engaging one of the pinions of the reduction train and thus operative to retain the floor in any particular position to which it has been set, and it will be appreciated that the gear box casings or their covers may have suitable lubricators so that the journals of the reduction trains may be kept properly lubricated.

It will be noted that the supporting rollers have their ends reduced or inturned, for instance by a swaging or other appropriate process, thereby removing any possibility of the flexible band 5 constituting the floor being damaged during its movement or when heavy weights are applied during loading.

While in the embodiment described and illustrated the floor is arranged to move longitudinally of the vehicle to discharge at the rear thereof, when a side discharge is required it will be appreciated that the winding drums 3 and 4 may be disposed longitudinally at each side of the vehicle with the intermediate supporting rollers arranged in transverse rows and the floor moving transversely between the side drums for loading and discharge.

By the present invention a movable floor vehicle is provided which can be utilized efficiently over long periods without requiring attention or overhaul.

What I claim is:—

1. A movable floor for vehicles, comprising a frame including a pair of longitudinal side members and a pair of longitudinal intermediate members, brackets secured upon the outer sides of the end portions of the side members and projecting beyond the ends thereof, end drums rotatably mounted between the projecting ends of said brackets at the respective ends of the frame, a band of flexible material constituting the floor mounted on said drums, axles secured at their ends at the ends of the side members and extending through the intermediate members, alined rollers on said axles located between the side and intermediate members and between the intermediate members, other axles in rows secured at their ends in the adjacent longitudinal members only, and other rollers supporting the band between its ends and rotatable on the respective ones of the second named axles.

2. A movable floor for vehicles, comprising a frame including a pair of longitudinal side members and a pair of longitudinal intermediate members, brackets secured upon the outer sides of the end portions of the side members and projecting beyond the ends thereof, end drums rotatably mounted between the projecting ends of said brackets at the respective ends of the frame, a band of flexible material constituting the floor mounted on said drums, axles secured at their ends at the ends of the side members and extending through the intermediate members, alined rollers on said axles located between the side and intermediate members and between the intermediate members, other axles in rows secured at their ends in the adjacent longitudinal members only, and other rollers supporting the band between its ends and rotatable on the respective ones of the second named axles, the axles and rollers of each row being staggered in relation to the axles and rollers of the adjacent row.

ALLAN EVERETT RENWICK.